United States Patent [19]

Cawdron

[11] 4,388,337

[45] Jun. 14, 1983

[54] DRY DESSERT MIX COMPOSITION

[75] Inventor: Diane Cawdron, Radway, England

[73] Assignee: General Foods Limited, Banbury, England

[21] Appl. No.: 334,767

[22] Filed: Dec. 28, 1981

[51] Int. Cl.³ ............................................. A23L 1/195
[52] U.S. Cl. ................................... 426/573; 426/577; 426/579; 426/583
[58] Field of Search ................ 426/579, 577, 573, 583

[56]  References Cited

U.S. PATENT DOCUMENTS

| 2,784,099 | 3/1957 | Block | 426/577 |
| 3,619,209 | 11/1971 | Hegadorn | 426/577 |
| 3,729,322 | 4/1973 | Calvert | 426/583 |
| 3,932,680 | 1/1976 | Egli et al. | 426/583 |
| 3,934,049 | 1/1976 | Lauck | 426/579 |
| 4,081,566 | 3/1978 | Haber | 426/583 |
| 4,289,788 | 9/1981 | Cajigas | 426/583 |

Primary Examiner—Jeanette M. Hunter
Attorney, Agent, or Firm—Joyce P. Hill; Daniel J. Donovan; Thomas R. Savoie

[57]  ABSTRACT

A dry dessert powdered mix composition comprising a pectin, a modified starch, a rapidly dissolving uncoated edible acid, e.g., citric or lactic acid, and a slowly dissolving uncoated edible acid, e.g., adipic or fumaric acid, the ingredients and their proportions being selected such that the composition when mixed with milk produces a dessert product with a smooth gel structure and having a pH at or below 4.8. The pectin is preferably high-methoxy pectin and the preferred modified starch is propoxylated starch.

15 Claims, No Drawings

DRY DESSERT MIX COMPOSITION

DESCRIPTION

Technical Field

The present invention relates to a dry dessert powdered mix composition, particularly one which is shelf-stable and which, when mixed and stirred with cold milk, is ready to serve in 10 minutes.

The acidification of milk-based products below the iso-electric point of casein (milk protein) is difficult to achieve in the liquid form within a short period of time without curdling of the milk. Since the iso-electric point of casein is at about pH 4.6 (dependent upon conditions), problems arise in the preparation of acidic milk-based products having a pH at or below 4.8 (measured overall), from dry mix compositions.

We have now found that such problems can be reduced or overcome by the use of a two-stage acid system in conjunction with a rapidly dispersing pectin which stabilizes milk protein and a cold-milk soluble, acid-stable, modified starch.

According to the present invention there is provided a dry dessert powdered mix composition comprising a pectin, a modified starch, a rapidly dissolving uncoated edible acid and a slowly dissolving uncoated edible acid, the ingredients and their proportions being selected such that the composition when mixed with milk produces a dessert product with a smooth gel structure and having a pH at or below 4.8.

On mixing of the composition with milk the rapidly dissolving acid adjusts the pH to a value above 4.8 and the slowly dissolving acid gradually reduces the pH to 4.8 or below, and lower is required, so enabling the pectin now in solution to have time to stabilize first the casein.

This invention thus allows the incorporation of acidulents in milk-based desserts without curdling of the casein.

The dry powdered dessert mix composition of the present invention generally comprises 0.5 to 2% by weight of a pectin, 5 to 15% by weight of a modified starch, 0.4 to 1.8% by weight of a rapidly dissolving uncoated edible acid and 2.0 to 4.5% by weight of a slowly dissolving uncoated edible acid.

By "a pectin," as used herein, we mean one which is rapidly dispersible and which stabilizes milk protein. Particularly effective are high methoxy pectins.

By "a modified starch," as used herein, we mean one which is cold-milk soluble and acid-stable. The most preferred modified starch is a propoxylated starch (preferably containing not more than 13% by weight propoxyl groups). Such modified starches have numbers E1440, 1441 and 1442 in the proposed EEC Directive on modified starches.

The distinction between a slowly dissolving acid and a rapidly dissolving acid is based on their degree of water solubility, e.g., citric and lactic acids are very soluble in water, whereas adipic and fumaric acids are only soluble in water at 25° C. to the extent of 1.9 g and 0.6 g per 100 g., respectively. Their rate of dissolution parallels degree of solubility; furthermore, the lowering of pH of a solution to which they are added, especially buffered solutions such as milk can be observed to be much more gradual with such slowly dissolving acids as adipic, compared with such rapidly dissolving acids, as citric.

The preferred rapidly dissolving acids of this invention is lactic acid, and the preferred slowing dissolving acid is adipic acid. Lactic acid is, however, a liquid acid; for a powdered mix composition, lactic acid is added in the form of a spray-dried mix with a carrier, such as malto-dextrin. It may also be added in the form of yogurt powder (in which it is present to the extent of 10% or less), especially when it is also desired to incorporate the characteristic yogurt flavor in the product. Typically, yogurt powder may be used in an amount of from 8 to 20%, preferably from 8 to 12% by weight. In order to ensure that the pH lowering contribution of the rapidly dissolving acid is not too marked (i.e., not lower than a maximum of pH 4.9), the percentage quantity of the rapidly dissolving acid in the powder composition should preferably not exceed 1.8%, or alternatively, should provide less than 0.5% w/w concentration in the made-up product.

Additional gelling can be provided by a gelling agent, such as a mixture of tetrasodium pyrophosphate (Tetron) and disodium monohydrogen phosphate. Typically the gelling agent or agents are used in a total amount of 1.0 to 3.0% by weight.

Furthermore, if it is desired that the dessert product is aerated, then a whipping agent, i.e., a substance which provides aeration of the product when the composition/milk mixture is whipped, such as a whippable spray-dried fat emulsion, may be included in the composition. Typically, the whipping agent is used in an amount of 30 to 50% by weight.

A sugar, preferably sucrose which acts as both a sweetener and a bulking agent, may also be included in the composition. Generally, it is used in an amount of from 10 to 40% by weight, preferably 20 to 35% by weight. The composition may also contain flavors and colors. The components in such a powdered mix composition will each be of small particle sizes to facilitate uniform blending and stable mixes, as conventional.

EXAMPLE

The composition may be packaged in pouches, envelopes, and other protective cartons which afford moisture barrier features.

The following examples illustrate dry powdered dessert mix compositions of the present invention and the manner in which they can be used to produce a ready-to-serve dessert preparation.

Example I

| Dry mix composition: | |
| --- | --- |
| Whippable spray-dried fat emulsion | 39% |
| Sucrose (pulverised sugar) | 22% |
| Modified starch (E.1440) | 10.5% |
| Phosphates (Tetron and Disodium hydrogen phosphate) | 2.4% |
| High methoxy pectin (Genu Pectin type JM ex Hercules) | 1.2% |
| Yogurt powder (containing 8% lactic acid) | 10.5% |
| Lactic acid powder (20% lactic acid) | 4.8% |
| Adipic acid | 4.0% |
| Flavors and colors | 5.6% |
| | 100.0% |

67 grams of the above dry mix composition were added to ½ pint of cold milk. After stirring and leaving to stand for 10 minutes, there was produced a ready-to-serve aerated gelled dessert having the characteristic yogurt taste.

Example II

| Dry mix composition: | |
|---|---|
| Whippable spray-dried fat emulsion | 35% |
| pulverised sugar (sucrose) | 31% |
| Modified starch (E. 1440) | 13% |
| High methoxy pectin (Genu Pectin type JM ex Hercules) | 1.1% |
| Tetron | 1.2% |
| Disodium phosphate | 1.2% |
| Yogurt powder (4% lactic acid) | 10.5% |
| Fumaric acid | 3.0% |
| Flavor and color | 4.0% |
| | 100.0% |

77 grams of the above dry mix composition were added to ½ pint of cold milk. After stirring and leaving to stand for 10 minutes, there was produced a ready-to-serve aerated gelled dessert having the characteristic yogurt flavor, yet somewhat less sharp in acid taste than Example I.

Example III

| Dry mix composition: | |
|---|---|
| Whippable spray-dried fat emulsion | 39% |
| Sucrose | 23% |
| Modified Starch (E. 1440) | 10.5% |
| Phosphates (Tetron and Disodium phosphate) | 1.2% |
| High methoxy pectin (Genu Pectin type JM ex Hercules) | 1.2% |
| Yogurt powder (8% lactic acid) | 10.5% |
| Lactic acid powder (20% lactic acid) | 4.8% |
| Adipic acid | 4.0% |
| Flavors and colors | 6.8% |
| | 100.0% |

67 grams of the above dry mix composition were added to ½ pint of cold milk. After stirring and leaving to stand for 10 minutes there was produced a ready-to-serve aerated gelled dessert having the characteristic yogurt taste.

I claim:

1. A dry powdered mix composition for mixing with cold milk to produce a ready-to-serve, milk-based preparation having a pH at or below 4.8 comprising 0.5 to 2% by weight of a high methoxy pectin, 5 to 15% by weight of a modified starch, 0.4 to 1.8% by weight of a rapidly dissolving uncoated edible acid selected from the group consisting of citric acid and lactic acid and 2.0 to 4.5% by weight of a slowly dissolving uncoated edible acid selected from the group consisting of adipic acid and fumaric acid, the ingredients and their proportions being selected such that the dry powdered composition when mixed with milk allows the incorporation of acidulents in the milk-based preparation without curdling of the casein.

2. A composition as claimed in claim 1, wherein the modified starch is a propoxylated starch.

3. A composition as claimed in claim 2, wherein the starch contains not more than 13% by weight of propoxyl groups.

4. A composition as claimed in claim 1 wherein the rapidly dissolving edible acid is lactic acid.

5. A composition as claimed in claim 1, wherein the slowly dissolving edible acid is adipic acid.

6. A composition as claimed in claim 1, comprising yogurt powder in an amount such that the composition when mixed with milk produces a dessert product having a yogurt taste.

7. A composition as claimed in claim 6, wherein the yogurt powder is present in an amount of 8 to 12% by weight.

8. A composition as claimed in claim 1, comprising an additional gelling agent in an amount such that the composition when mixed with milk produces a gelled dessert product.

9. A composition as claimed in claim 8, wherein the additional gelling agent is present in an amount of 1.0 to 3.0% by weight.

10. A composition as claimed in claim 8 or claim 9, wherein the additional gelling agent is a phosphate or a mixture of phosphates.

11. A composition as claimed in claim 1, comprising a whipping agent in an amount such that the composition when mixed with milk provides an aerated dessert product.

12. A composition as claimed in claim 11, wherein the whipping agent is present in an amount of 30 to 50% by weight.

13. A composition as claimed in claim 11 or claim 18, wherein the whipping agent is a whippable spray-dried fat emulsion.

14. A composition as claimed in claim 1 which contains sucrose in an amount of from 10 to 40% by weight.

15. A composition as claimed in claim 1 which is packaged in a pouch, envelope or other protective carton.

* * * * *